(12) United States Patent
Chen (10) Patent No.: US 11,380,036 B2
(45) Date of Patent: Jul. 5, 2022

(54) METHOD OF ESTABLISHING VISUAL IMAGES OF MODELS OF BATTERY STATUS

(71) Applicant: Simplo Technology Co., Ltd., Hsinchu County (TW)

(72) Inventor: Ming-Ta Chen, Hsinchu County (TW)

(73) Assignee: Simplo Technology Co., Ltd., Hsinchu County (TW)

( * ) Notice: Subject to any disclaimer, the term of this patent is extended or adjusted under 35 U.S.C. 154(b) by 0 days.

(21) Appl. No.: 17/103,961

(22) Filed: Nov. 25, 2020

(65) Prior Publication Data

US 2021/0166453 A1 Jun. 3, 2021

(30) Foreign Application Priority Data

Nov. 28, 2019 (TW) .................................. 108143313

(51) Int. Cl.
*G06T 11/60* (2006.01)
*H02J 7/00* (2006.01)
*G06T 11/00* (2006.01)

(52) U.S. Cl.
CPC ............ *G06T 11/60* (2013.01); *G06T 11/001* (2013.01); *H02J 7/0013* (2013.01); *H02J 7/0047* (2013.01)

(58) Field of Classification Search
CPC ............................... G06T 11/60; G06T 11/001
See application file for complete search history.

(56) References Cited

U.S. PATENT DOCUMENTS

| | | | | |
|---|---|---|---|---|
| 2014/0136132 A1* | 5/2014 | Maekawa | ........... | H01M 10/052 702/63 |
| 2015/0369875 A1* | 12/2015 | Ishii | ..................... | G01R 31/382 702/63 |
| 2017/0136914 A1* | 5/2017 | Drake | ..................... | B60L 58/21 |

\* cited by examiner

*Primary Examiner* — Shivang I Patel
(74) *Attorney, Agent, or Firm* — Winston Hsu (57) ABSTRACT

A method for establishing visual images of models of battery status transforms data of one or more characteristic parameters collected in a period of time into multiple images composed by normalized pixels corresponding to the data. The multiple images are superimposed with one another to form variant image(s) with variant areas and further moving trends of the variant areas. The visualization of data and superimposition of the visualized images facilitates correlation and variation analysis among characteristic parameters of the battery module. The present invention transform data analysis to image analysis, and therefore, the present invention facilitates following analysis and model training, which can adapt to environmental changes, and indicate battery status and battery events efficiently and accurately.

12 Claims, 5 Drawing Sheets

METHOD OF ESTABLISHING VISUAL IMAGES OF MODELS OF BATTERY STATUS

BACKGROUND OF THE INVENTION

1. Field of the Invention

The present invention relates to a method of determination of battery status, and more particularly, to a method of establishing visual images of models of battery status for analysis, determination and learning.

2. Description of the Prior Art

A conventional battery module usually utilizes a battery management system (BMS) to capture various parameters thereof, such as a voltage, a current, a temperature, a state of charge (SOC), a state of health (SOH), a fully charged capacity (FCC), a separating film parameter, a electrolyte parameter, a positive electrode material, a negative electrode material and etc., and further to determine battery status of the battery module by monitoring and analyzing at least one of the captured parameters and variation thereof. Specifically, the BMS can utilize a microcontroller unit (MCU) to determine the status of the battery module by calculating the captured parameters in a specific algorithm. For example, a SOH of a battery module can be calculated by dividing a current FCC of the battery module by an FCC of a fully healthy or brand new battery module, wherein there are various algorithms for calculating the current fully charged capacity of the battery module.

Although there are various algorithms for calculating an SOH, an FCC, a battery protection condition and etc., such data is indicated numerically by electrical quantities, such as a voltage, a current, a temperature and etc. In practical complex operation, a user can only carry out data analysis based on the current numeral data and limited experience. Therefore, it causes a technical problem that, even with various algorithms, the battery status cannot be accurately indicated and there is no way to reasonably attribute change of the battery status either.

SUMMARY OF THE INVENTION

It is an objective of the present invention to provide a method of establishing visual images of models of battery status by domain transfer, which can adapt to environmental changes, and indicate battery status and battery events efficiently and accurately, for solving the aforementioned problem.

In order to achieve the aforementioned objective, the present invention discloses a method of establishing visual images of models of battery status. The method includes collecting a plurality of data values of at least one characteristic parameter of one of a plurality of battery modules in one of a plurality of time periods; a control unit forming at least one first characteristic image and a second characteristic image according to the plurality of data values; the control unit forming one of a plurality of variant images by superimposing the at least one first characteristic image and the second characteristic image, wherein each of the plurality of variant images comprises at least one variant area; and the control unit forming at least one moving variant area according to the plurality of variant images corresponding to the plurality of time periods, wherein the at least one moving variant area is formed by a time variation of a combination of the at least one variant area of each of the plurality of variant images; wherein the at least one first characteristic image, the second characteristic image and the plurality of variant images are images with a plurality of pixels.

According to an embodiment of the present invention, collecting the plurality of data values of the at least one characteristic parameter of the one of the plurality of battery modules in the one of the plurality of time periods comprises collecting a plurality of first data values of a first characteristic parameter and a plurality of second data values of a second characteristic parameter different from the first characteristic parameter in the one of the plurality of time periods; wherein the control unit forms the at least one first characteristic image according to the plurality of first data values and forms the second characteristic image according to the plurality of second data values.

According to an embodiment of the present invention, collecting the plurality of data values of the at least one characteristic parameter of the one of the plurality of battery modules in the one of the plurality of time periods comprises collecting a plurality of first data values of the at least one characteristic parameter of the one of the plurality of battery modules in a first subsection of the one of the plurality of time periods and collecting a plurality of second data values of the at least one characteristic parameter of the one of the plurality of battery modules in a second subsection of the one of the plurality of time periods; wherein the control unit forms the at least one first characteristic image according to the plurality of first data values and forms the second characteristic image according to the plurality of second data values.

According to an embodiment of the present invention, each pixel of the at least one first characteristic image and the second characteristic image is corresponding to one of the plurality of data values of the at least one characteristic parameter, and a color shade of each pixel is corresponding to a scale of the one of the plurality of data values.

According to an embodiment of the present invention, each pixel of the at least one first characteristic image and the second characteristic image is corresponding to a data value difference between two of the plurality of data values of the at least one characteristic parameter, and a color shade of each pixel is corresponding to a scale of the data value difference between the two of the plurality of the data values.

According to an embodiment of the present invention, the method further includes performing analysis and model training of the plurality of data values according to the at least one variant area or the at least one moving variant area.

According to an embodiment of the present invention, performing analysis and model training of the plurality of data values according to the at least one variant area or the at least one moving variant area comprises performing analysis and model training of the plurality of data values according to the at least one variant area or the at least one moving variant area by machine learning, deep learning or reinforcement learning.

According to an embodiment of the present invention, a time variation of the at least one moving variant area comprises at least one of a time variation of a color shade of a pixel of the at least one variant area, a time variation of a scale of the at least one variant area and a time variation of a shape of the at least one variant area.

According to an embodiment of the present invention, the at least one characteristic parameter comprises at least one of a capacity, a voltage, a current, a temperature, a battery separator parameter, a electrolyte parameter, an aging level of a positive pole and an aging level of a negative pole of the one of the plurality of battery modules.

According to an embodiment of the present invention, the at least one first characteristic image, the second characteristic image and the plurality of variant images are two-dimensional images with a plurality of pixels.

According to an embodiment of the present invention, the method further includes collecting the plurality of data values of the at least one characteristic parameter of each of the plurality of battery modules in the plurality of time periods; the control unit forming a plurality of characteristic images of each of the plurality of battery modules according to the plurality of data values of the at least one characteristic parameter of each of the plurality of battery modules corresponding to the plurality of time periods; the control unit forming the plurality of variant images of the plurality of battery modules by superimposing the plurality of characteristic images of the plurality of battery modules; and the control unit forming a relevant image by superimposing corresponding ones of the plurality variant images of the plurality of battery modules, wherein the relevant image is an image with a plurality of pixels.

According to an embodiment of the present invention, the plurality of variant images and the relevant image are two-dimensional images with a plurality of pixels.

In summary, in the present invention, the visualization of data and superimposition of the visualized images facilitates correlation and variation analysis among characteristic parameters of the battery module. The present invention transforms numerical data analysis to image analysis, and therefore, the present invention facilitates analysis and model training, which can adapt to environmental changes, and indicate battery status and battery events efficiently and accurately.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 1:
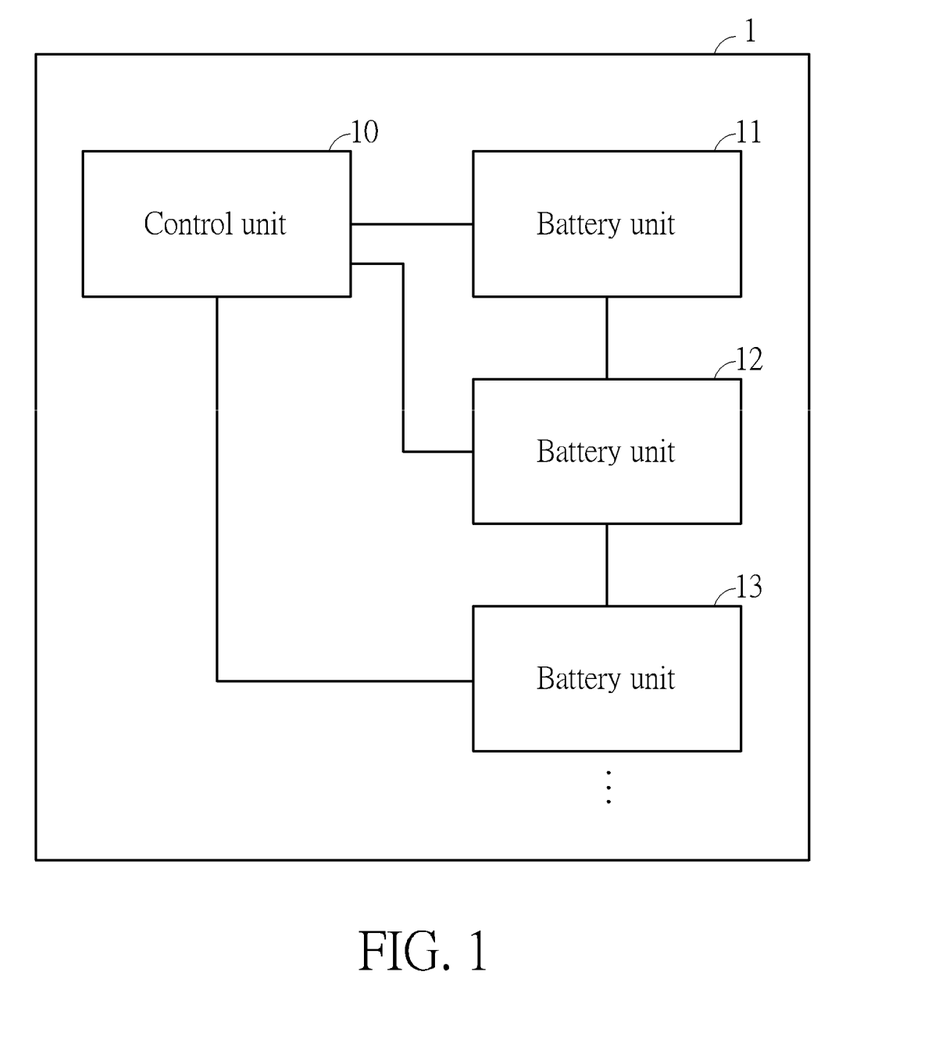
FIG. 1 is a functional block diagram of a battery module according to an embodiment of the present invention.

Please refer to FIG. 1. FIG. 1 is a functional block diagram of a battery module 1 according to an embodiment of the present invention. The batter module 1 includes a control unit 10 and a plurality of batter units 11, 12, 13. The control unit 10 can be a battery management system including a microcontroller unit or a processor. Each of the battery units 11, 12, 13 can be a battery cell. The control unit 10 can control charging and discharging operations of the battery units 11, 12, 13 and monitor a plurality of characteristic parameters of the battery units 11, 12, 13.

Figure 2:
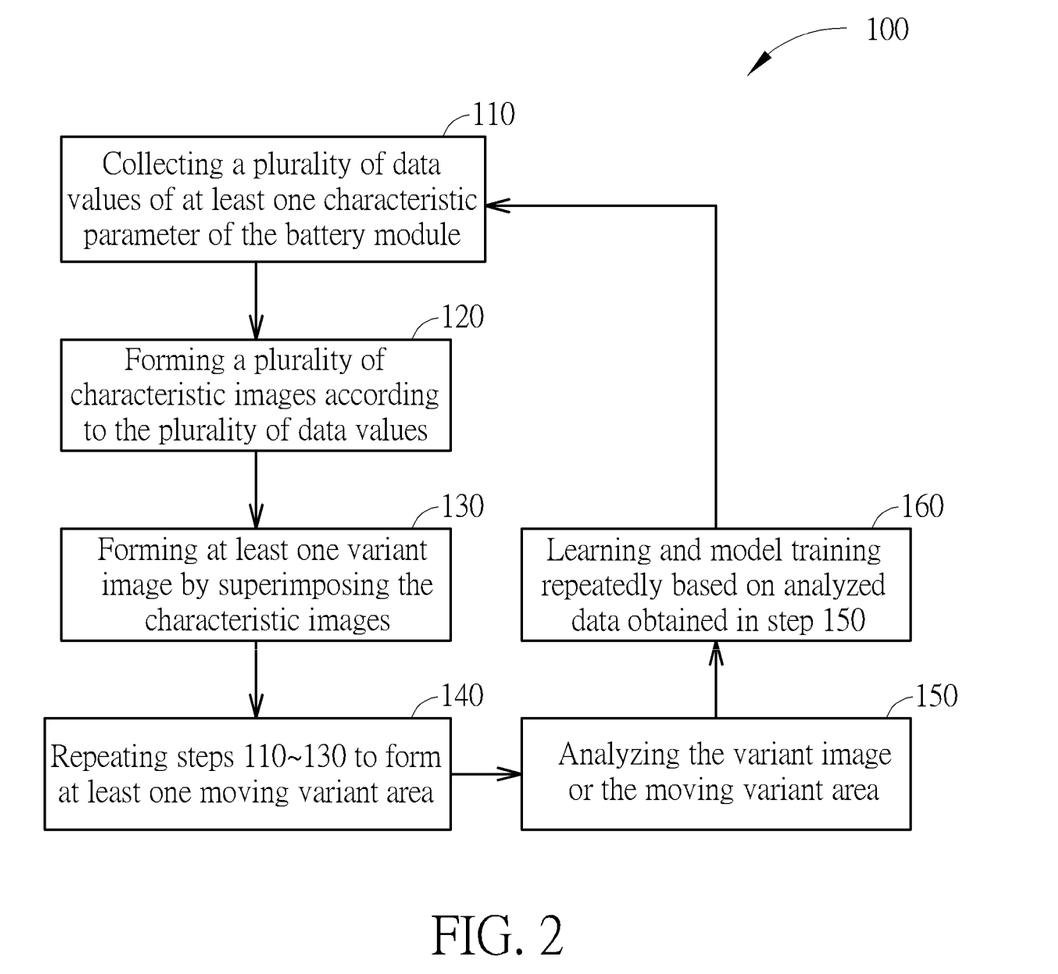
FIG. 2 is a flow chart of a method of establishing visual images of models of battery status according to the embodiment of the present invention.
Figure 3:
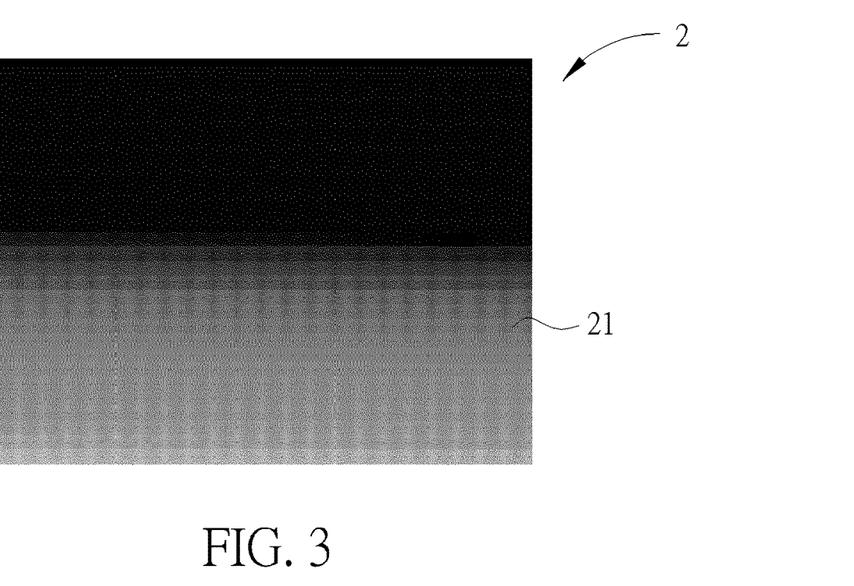
FIG. 3 is a diagram of a characteristic image of a plurality of characteristic images according to the embodiment.
Figure 4:
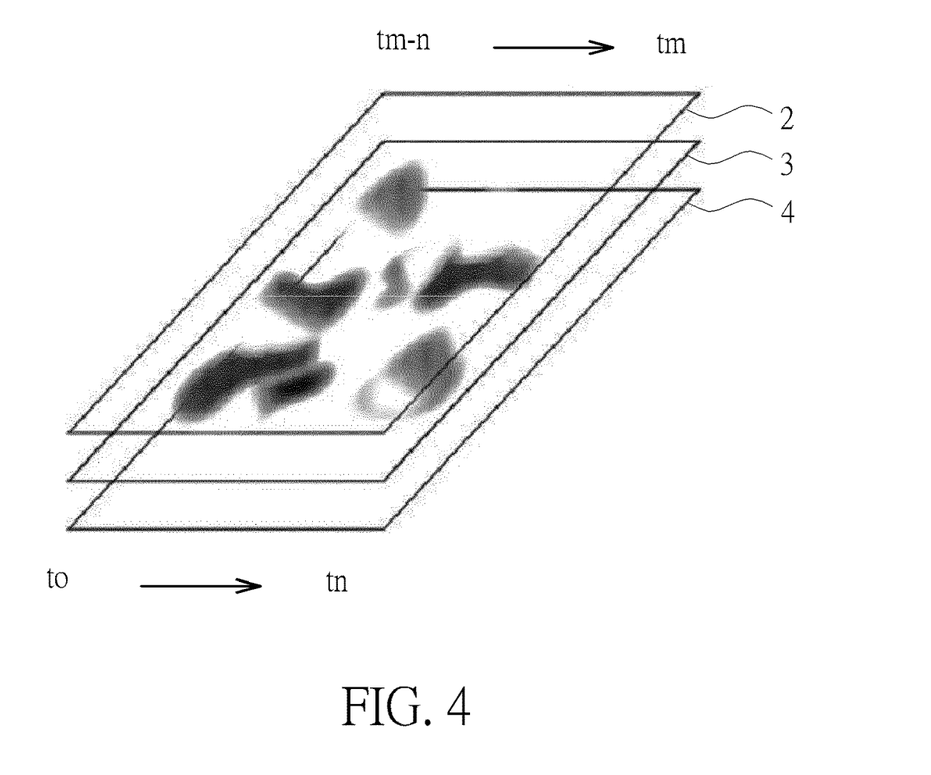
FIG. 4 is a diagram of superimposed characteristic images according to the embodiment of the present invention.
Figure 5:
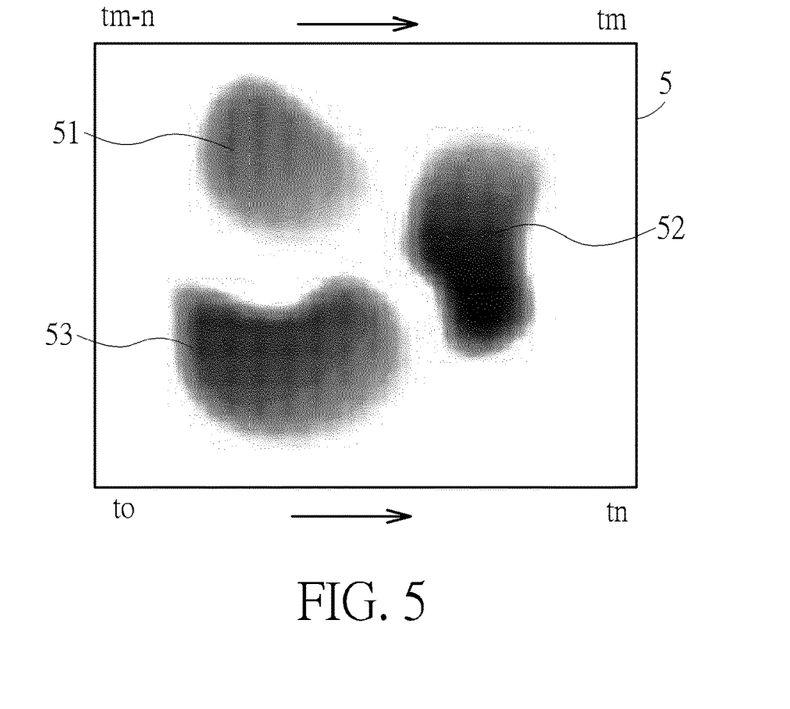
FIG. 5 is a diagram of a variant image with a plurality of variant areas according to the embodiment of the present invention.
Figure 6:
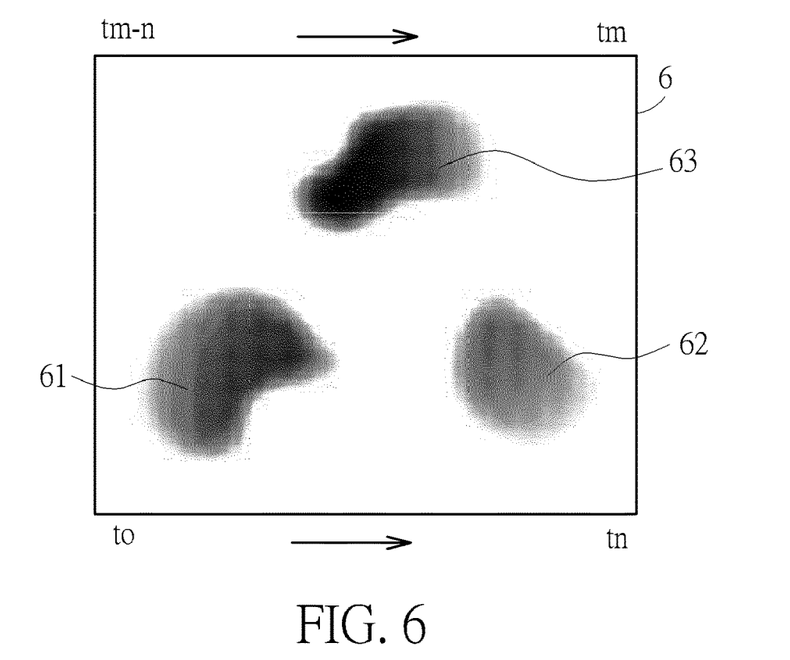
FIG. 6 is a diagram of a plurality of moving variant areas formed by a time variation of a combination of the plurality of variant areas of each variant image according to the embodiment of the present invention.

Please refer to FIG. 2 to FIG. 6. FIG. 2 is a flow chart of a method 100 of establishing visual images of models of battery status according to the embodiment of the present invention. FIG. 3 is a diagram of one of a plurality of characteristic images 2, 3, 4 according to the embodiment. FIG. 4 is a diagram of the superimposed characteristic images 2, 3, 4 according to the embodiment of the present invention. FIG. 5 is a diagram of a variant image 5 with a plurality of variant areas 51, 52, 53 according to the embodiment of the present invention. FIG. 6 is a diagram of a plurality of moving variant areas 61, 62, 63 formed by a time variation of a combination of the variant areas 51, 52, 53 of each variant image 5 according to the embodiment of the present invention. As shown in FIG. 2, the method 100 includes the following steps:

step 110: collecting a plurality of data values of at least one characteristic parameter of the battery module 1;

step 120: forming a plurality of characteristic images according to the plurality of data values;

step 130: forming at least one variant image by superimposing the characteristic images;

step 140: repeating steps 110-130 to form at least one moving variant area;

step 150: analyzing the variant image or the moving variant area; and step 160: learning and model training repeatedly based on analyzed data obtained in step 150.

The present invention can form a plurality of visual images corresponding to the data values of the characteristic parameters of the battery module 1 by domain transfer and further process data analysis, learning and model training based on the visual images. The battery module 1 can include one or more battery units 11, 12, 13. Therefore, the characteristic parameter can be an overall performance characteristic parameter of the battery module 1 or characteristic parameters of the battery units 11, 12, 13. However, the present invention is not limited thereto. In this embodiment, there are various characteristic parameters of the battery module 1. For example, the characteristic parameter can be a capacity, a voltage, a current, a temperature, a separating film parameter, an electrolyte parameter, an aging of a positive electrode, an aging of a negative electrode, a loading relation or etc. In step 110, the control unit 10 of the battery module 1 can monitor and collect data values of a characteristic parameter in a time period of operation of the battery module 1 or data values of two or more characteristic parameters in a same time period of operation of the battery module 1. In other words, in step 110, the control unit 10 can collect data values of multiple characteristic parameters per unit time in a continuous time period. For example, the characteristic parameters can be a voltage, a current and a temperature of the battery module 1, and the control unit 10 collects a voltage value, a current value, and a temperature value per unit time, e.g., one second, for a continuous time period.

In step 120, the control unit 10 or an external analysis and management system connected to the battery module 1 establishes characteristic images by domain transfer according to the data values collected in step 110. Specifically, the control unit 10 can establish at least one first characteristic image and a second characteristic image according to data values of one or more characteristic parameters. For example, in this embodiment, the data value of the characteristic parameter can be converted into a normalized pixel, and a scale of the data value is corresponding to a color shade of the normalized pixel. However, the present invention is not limited to this embodiment. In another embodiment, a scale of the data value can be configured to be corresponding to a grayscale of the normalized pixel. As shown in FIG. 3, the data values are collected in a continuous time period, and a scale of the data value is corresponding to a color shade of a corresponding normalized pixel 21. The normalized pixels 21 corresponding to the data values can be arranged to form a two-dimensional image. For example, a voltage variation value can be indicated by a two-dimensional array of pixels with different color shades in the first characteristic image, and a temperature variation value can be indicated by another two-dimensional array of pixels with different color shades in the second characteristic image.

It should be noticed that, in steps 110 and 120, one or more characteristic parameters can be selected based on experience or several common models to collect corresponding data values and form corresponding characteristic images for analysis. For example, there can be one selected characteristic parameter of the battery module 1, such as a voltage variation value, or a plurality of selected characteristic parameters of the battery module 1, such as a voltage variation value and a temperature variation value. In an embodiment, the characteristic images including the first characteristic image and the second characteristic image (or a third characteristic image, a fourth characteristic image and etc.) can be established according to different combinations of characteristic parameters, including, e.g., a combination of a current and a temperature, a combination of a voltage and a temperature, a combination of a voltage and a current, a combination of a voltage, a current and a separating film parameter and etc., for analyzing a relation of different characteristic parameters in a time period. As shown in FIG. 4, the first characteristic image 2 can be a two-dimensional image with pixels indicating voltage values arranged sequentially in a time period, the second characteristic image 3 can be a two-dimensional image with pixels indicating current values arranged sequentially in the same time period, and the third characteristic image 4 can be a two-dimensional image with pixels indicating temperature values arranged sequentially in the same time period.

In another embodiment, the characteristic images also can be established by data values of one single characteristic parameter in different stages or subsections of a time period for analysis of a variation or a feature of the specific characteristic parameter in different time stages or subsections. For example, the control unit can collect voltage values in a first subsection and a second subsection of a time period, so as to respectively establish a first characteristic image corresponding to the first subsection and a second characteristic image corresponding to the second subsection for analyzing a variation relation of the voltage value of the battery module between different subsections.

Furthermore, the aforementioned established characteristic image can be formed by pixels whose color shades are corresponding to the scales of the data vales of the characteristic parameter. In another embodiment, a characteristic image also can be formed by pixels whose color shades are corresponding to data value differences between data values collected at a unit time point and at a previous unit time point. For example, if characteristic parameters are a voltage, a current and a temperature, three characteristic images can be formed by pixels whose grayscales are corresponding to voltage differences ($\Delta V$), current differences ($\Delta I$) and a temperature differences ($\Delta T$), wherein $\Delta V = V_{tn} - V_{tn-1}$, $\Delta I = I_{tn} - I_{tn-1}$, and $\Delta T = T_{tn} - T_{tn-1}$.

It should be noticed that, in step 120 of this embodiment, the characteristic image can be a two-dimensional image. However, it is not limited thereto. In another embodiment, other parameters or variables can be added, so that the characteristic image can be a three-dimensional image.

After the normalized two or more characteristic images are established, in step 130, the control unit 10 or the external analysis and management system can superimpose these characteristic images 2, 3, 4 as shown in FIG. 4 to form the variant image 5 as shown in FIG. 5. Since the first characteristic image 2, the second characteristic image 3 and the third characteristic image 4 shown in FIG. 4 including pixels with different color shades or grayscales, one or more variant areas 51, 52, 53 can be formed in the variant image 5 after superimposing the first characteristic image 2, the second characteristic image 3 and the third characteristic image 4. These variant areas 51, 52, 53 indicate a variation relation of characteristic parameters so as to form a reference basis for predicting the status of the battery module 1.

In step 140, at least one moving variant area can be formed by repeating steps 110-130. In other words, the multiple variant images 5 including one or more variant areas 51, 52, 53 respectively corresponding to different time periods, which can be continuous or non-continuous time periods, can be generated by steps 110-130 repeatedly, and one or more moving variant areas 61, 62, 63, as shown in FIG. 6, i.e., a moving variation of the variant areas 51, 52, 53, can be formed by superimposing these variant images 5. In other words, the moving variant areas 61, 62, 63 can be formed by a time variation of a combination of the variant areas 51, 52, 53 of each variant image 5, and a time variation of the moving variant areas 61, 62, 63 can be a time variation of a color shade of a pixel of each of the variant areas 51, 52, 53, a time variation of a scale of each of the variant areas 51, 52, 53, and a time variation of a shape of each of the variant areas 51, 52, 53. However, the present invention is not limited thereto.

Repeated visualization of collected data values of the characteristic parameter into the characteristic image and forming the variant image, the variant area, and the moving variant area by superimposing the corresponding visualized images can indicate a current status of the battery module 1 or battery events of the battery module 1 in different time periods. A variation of the characteristic parameter of the battery module 1 can be indicated by a variation of a color shade of a pixel, a variation of a scale of a superimposing area or a variation of a shape of a superimposing area.

After the characteristic image and the variation area are formed, a visualized image of a current status, e.g., a SOH, of the battery module 1 and the battery event can be determined. In steps 150 and 160, the one or more variant area 51, 52, 53 or the one or more moving variant area 61, 62, 63 can be used for data analysis and training for indicating a relation of the battery event and the characteristic parameter. In an embodiment, by repeated machine learning, deep learning, and reinforcement learning, the visualized images formed by the collected data values can be inputted in a training model, so as to determine image classification of the battery event by visualization of data and training. It should be noticed that collecting and training can be performed for the normal status of the battery module 1, or for abnormal events of the battery module 1. For example, an image classification of an over temperature event can be obtained by learning and training on data values of temperature, and an image classification of a battery aging event can be obtained by training on a battery aging factor.

Taking a state of health (SOH) of the battery module 1 as an example, the SOH of the battery module 1 is mainly related to the number of charging and discharging cycles, and other factors, e.g., a temperature, a magnitude of a charging current, and whether it is maintained at a high voltage level. The current SOH of the battery module 1 can be obtained by comparison of images formed by the method of the present invention, and the future variation of SOH of the battery module 1 can be predicted. Furthermore, an attribution of aging of the battery module or an abnormal event that causes acceleration of aging of the battery module can be obtained.

Taking an abnormal event of the battery module 1 as an example, the abnormal event that causes acceleration of aging of the battery module 1 can be attributed to abnormal of a voltage, a current, a temperature, a separating film, a electrolyte, a positive electrode, or a negative electrode by comparison images formed by the method of the present invention.

Figure 7:
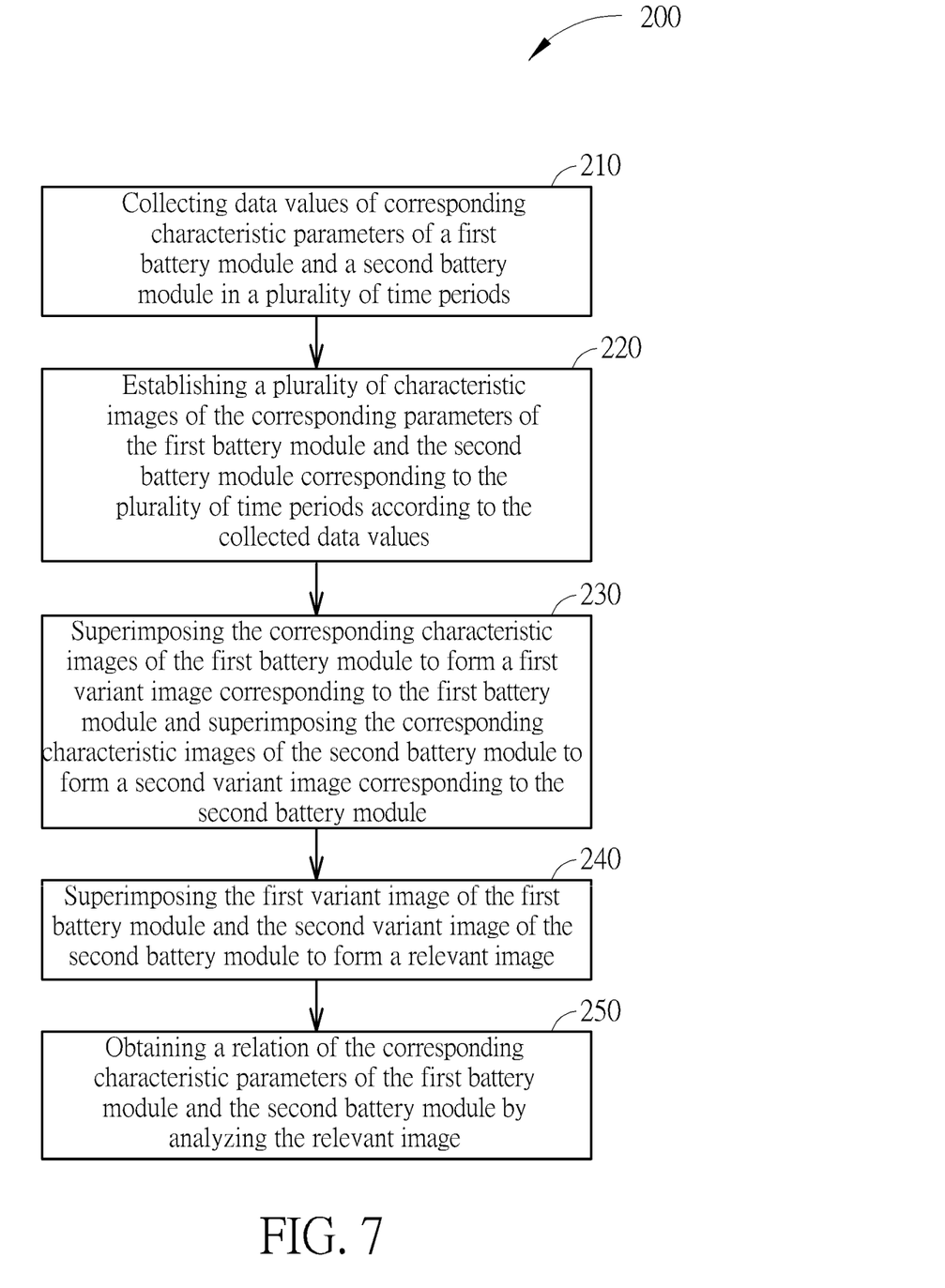
FIG. 7 is a flow chart of a method of determination of a relation of corresponding characteristic parameters of a plurality of batter modules by establishing visual images of models of battery status according to another embodiment of the present invention.

In addition, the method of establishing visual images of models of battery status of the present invention can also be used to obtain a relation of corresponding characteristic parameters of a plurality of battery modules. For example, please refer to FIG. 7. FIG. 7 is a flow chart of a method 200 of determination of a relation of corresponding characteristic parameters of a plurality of batter modules by establishing visual images of models of battery status according to another embodiment of the present invention. As shown in FIG. 7, when it is desired to obtain a relation of corresponding characteristic parameters of a first battery module and a second battery module of a plurality of battery modules, data values of the corresponding characteristic parameters of the first battery module and the second battery module in a plurality of time periods can be collected to establish a plurality of characteristic images of the corresponding parameters of the first battery module and the second battery module corresponding to the plurality of time periods (steps 210, 220). Afterwards, the corresponding characteristic images of the first battery module can be superimposed to form a first variant image corresponding to the first battery module, and the corresponding characteristic images of the second battery module can be superimposed to form a second variant image corresponding to the second battery module, wherein the first variant image includes at least one first variant area, and the second variant image includes at least one second variant area (step 230). Establishing the characteristic image and the variant image of this embodiment are similar to the ones described in the abovementioned embodiment. Detailed description is omitted herein. After the first variant image of the first battery module and the second variant image of the second battery module are established, a relevant image can be formed by superimposing the first variant image of the first battery module and the second variant image of the second battery module. Therefore, the relation of the corresponding characteristic parameters of the first battery module and the second battery module can be obtained by analyzing the relevant image (steps 240, 250). In other words, the method 200 can indicate the relation of the corresponding characteristic parameters of the first battery module and the second battery module by visualization of collected data values. In addition, similar to the aforementioned embodiment, the characteristic image, the variant image, and the relevant image of this embodiment can be are preferably two-dimensional images including a plurality of pixels. The method of establishing visual images of models of battery status of the present invention allows a user to determine a battery status or a battery abnormal event by observing images intuitively.

In summary, the present invention collects data values of one or more characteristic parameters of the battery module in a time period and forms a plurality of characteristic images including normalized pixels converted from the data values. Furthermore, the present invention further forms a variant image including at least one variant area by superimposing the characteristic images and forms at least one moving variant area by superimposing variant images corresponding to different time periods. The visualization of data and superimposition of the visualized images facilitates correlation and variation analysis among characteristic parameters of the battery module. The present invention transforms numerical data analysis to image analysis, and therefore, the present invention facilitates analysis and model training, which can adapt to environmental changes, and indicate battery status and battery events efficiently and accurately.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of establishing visual images of models of battery status, the method comprising:
   collecting a plurality of data values of at least one characteristic parameter of one of a plurality of battery modules in one of a plurality of time periods;
   a control unit forming at least one first characteristic image and a second characteristic image according to the plurality of data values;
   the control unit forming one of a plurality of variant images by superimposing the at least one first characteristic image and the second characteristic image, wherein each of the plurality of variant images comprises at least one variant area; and
   the control unit forming at least one moving variant area by superimposing the plurality of variant images corresponding to the plurality of time periods, wherein the at least one moving variant area is formed by a time variation of a combination of the at least one variant area of each of the plurality of variant images;
   wherein the at least one first characteristic image, the second characteristic image and the plurality of variant images are images with a plurality of pixels, and the pixels of the at least one first characteristic image and the second characteristic image are normalized pixels converted from the plurality of data values.

2. The method of claim 1, wherein collecting the plurality of data values of the at least one characteristic parameter of the one of the plurality of battery modules in the one of the plurality of time periods comprises:
collecting a plurality of first data values of a first characteristic parameter and a plurality of second data values of a second characteristic parameter different from the first characteristic parameter in the one of the plurality of time periods;
wherein the control unit forms the at least one first characteristic image according to the plurality of first data values and forms the second characteristic image according to the plurality of second data values.

3. The method of claim 1, wherein collecting the plurality of data values of the at least one characteristic parameter of the one of the plurality of battery modules in the one of the plurality of time periods comprises:
collecting a plurality of first data values of the at least one characteristic parameter of the one of the plurality of battery modules in a first subsection of the one of the plurality of time periods and collecting a plurality of second data values of the at least one characteristic parameter of the one of the plurality of battery modules in a second subsection of the one of the plurality of time periods;
wherein the control unit forms the at least one first characteristic image according to the plurality of first data values and forms the second characteristic image according to the plurality of second data values.

4. The method of claim 1, wherein each pixel of the at least one first characteristic image and the second characteristic image is corresponding to one of the plurality of data values of the at least one characteristic parameter, and a color shade of each pixel is corresponding to a scale of the one of the plurality of data values.

5. The method of claim 1, wherein each pixel of the at least one first characteristic image and the second characteristic image is corresponding to a data value difference between two of the plurality of data values of the at least one characteristic parameter, and a color shade of each pixel is corresponding to a scale of the data value difference between the two of the plurality of the data values.

6. The method of claim 1, further comprising:
performing analysis and model training of the plurality of data values according to the at least one variant area or the at least one moving variant area.

7. The method of claim 6, wherein performing analysis and model training of the plurality of data values according to the at least one variant area or the at least one moving variant area comprises:
performing analysis and model training of the plurality of data values according to the at least one variant area or the at least one moving variant area by machine learning, deep learning or reinforcement learning.

8. The method of claim 1, wherein a time variation of the at least one moving variant area comprises at least one of a time variation of a color shade of a pixel of the at least one variant area, a time variation of a scale of the at least one variant area and a time variation of a shape of the at least one variant area.

9. The method of claim 1, wherein the at least one characteristic parameter comprises at least one of a capacity, a voltage, a current, a temperature, a battery separator parameter, a electrolyte parameter, an aging level of a positive pole and an aging level of a negative pole of the one of the plurality of battery modules.

10. The method of claim 1, wherein the at least one first characteristic image, the second characteristic image and the plurality of variant images are two-dimensional images with a plurality of pixels.

11. The method of claim 1, further comprising:
collecting the plurality of data values of the at least one characteristic parameter of each of the plurality of battery modules in the plurality of time periods;
the control unit forming a plurality of characteristic images of each of the plurality of battery modules according to the plurality of data values of the at least one characteristic parameter of each of the plurality of battery modules corresponding to the plurality of time periods;
the control unit forming the plurality of variant images of the plurality of battery modules by superimposing the plurality of characteristic images of the plurality of battery modules; and
the control unit forming a relevant image by superimposing corresponding ones of the plurality variant images of the plurality of battery modules, wherein the relevant image is an image with a plurality of pixels.

12. The method of claim 11, wherein the plurality of variant images and the relevant image are two-dimensional images with a plurality of pixels.

* * * * *